United States Patent [19]
Root, Jr.

[11] 3,772,689
[45] Nov. 13, 1973

[54] RADAR TARGET DISCRIMINATION METHOD AND APPARATUS

[75] Inventor: Lloyd W. Root, Jr., Huntsville, Ala.

[73] Assignee: The United States of America as represented by the Secretary of the Army

[22] Filed: Dec. 6, 1967

[21] Appl. No.: 690,703

[52] U.S. Cl. .............................. 343/5 SA, 343/17.2
[51] Int. Cl. ............................................... G01s 9/02
[58] Field of Search .................... 343/5, 17.2, 100.3, 343/5 SA

[56] References Cited
UNITED STATES PATENTS

| | | | |
|---|---|---|---|
| 3,324,469 | 6/1967 | Szerlip | 343/17.2 |
| 3,212,053 | 10/1965 | Finney | 343/17.2 X |
| 2,508,571 | 5/1950 | Hudspeth | 343/100.3 |

Primary Examiner—Malcolm F. Hubler
Attorney—Harry M. Saragovitz, Edward J. Kelly, Herbert Berl and Aubrey J. Dunn

[57] ABSTRACT

A method of and apparatus for discriminating radar targets. The targets are illuminated by radar pulses having different characteristics. The pulses may be of different frequencies or polarizations, or may be of the same frequency, but time separated. The different characteristics cause echoes of different amplitudes, from a complex target. The ratio of amplitudes is determined, and a target which yields the largest ratio for a given signal characteristic is assumed to be the most complex target.

11 Claims, 5 Drawing Figures

RADAR TARGET DISCRIMINATION METHOD AND APPARATUS

DEDICATORY CLAUSE

The invention described herein may be manufactured, used, and licensed by or for the Government for governmental purposes without the payment to me of any royalty thereon.

BACKGROUND OF THE INVENTION

This invention is in the field of radar signature analysis. In particular, the invention is an apparatus for and method whereby it is possible to discriminate between targets and decoys. Targets generally are electrically more complex than decoys. The invention takes advantage of the fact that the equivalent radar echo area of an object is a function of at least three things: (1) the frequency of the illuminating signals, (2) the polarization of the signals, and (3) the aspect angle at which the target is illuminated. For a very simple object, such as a sphere, the amplitude of echoes is independent of aspect angle. For a complex object, such as an aircraft, the amplitudes of echoes will have large variations, for various aspect angles. For a very complex target, very small variations in aspect angle will yield large variations in echo amplitude. Also, small variations in frequency or polarization of the illuminating signal will give large variations in echo amplitude. These variations of echo amplitude with different aspect angles are called "scintillations," and are ordinarily very undesirable in radar systems. The invention uses these scintillations to advantage.

SUMMARY OF THE INVENTION

The invention is a method and apparatus whereby scintillations of radar echoes may be used to determine complexity of objects being illuminated, or to detect a target in decoys. At least one variable is used for illuminating pulses. The pulses may be of different frequencies, or the same frequency but of different polarizations, or of the same frequency, but analyzed as a function of time to provide a time history of echo amplitudes. Such a time history would provide a dynamic measure of the target's aspect angle, which measure could also serve as a discrimination tool. The time, frequency, or polarization is varied, so that a maximum ratio of greatest echo amplitude to least echo amplitude is realized. The amount of variation for a maximum ratio is inversely related to target complexity. The less the variation for the maximum ratio, the more complex is the target.

DESCRIPTION OF THE PREFERRED EMBODIMENTS

Figure 1:
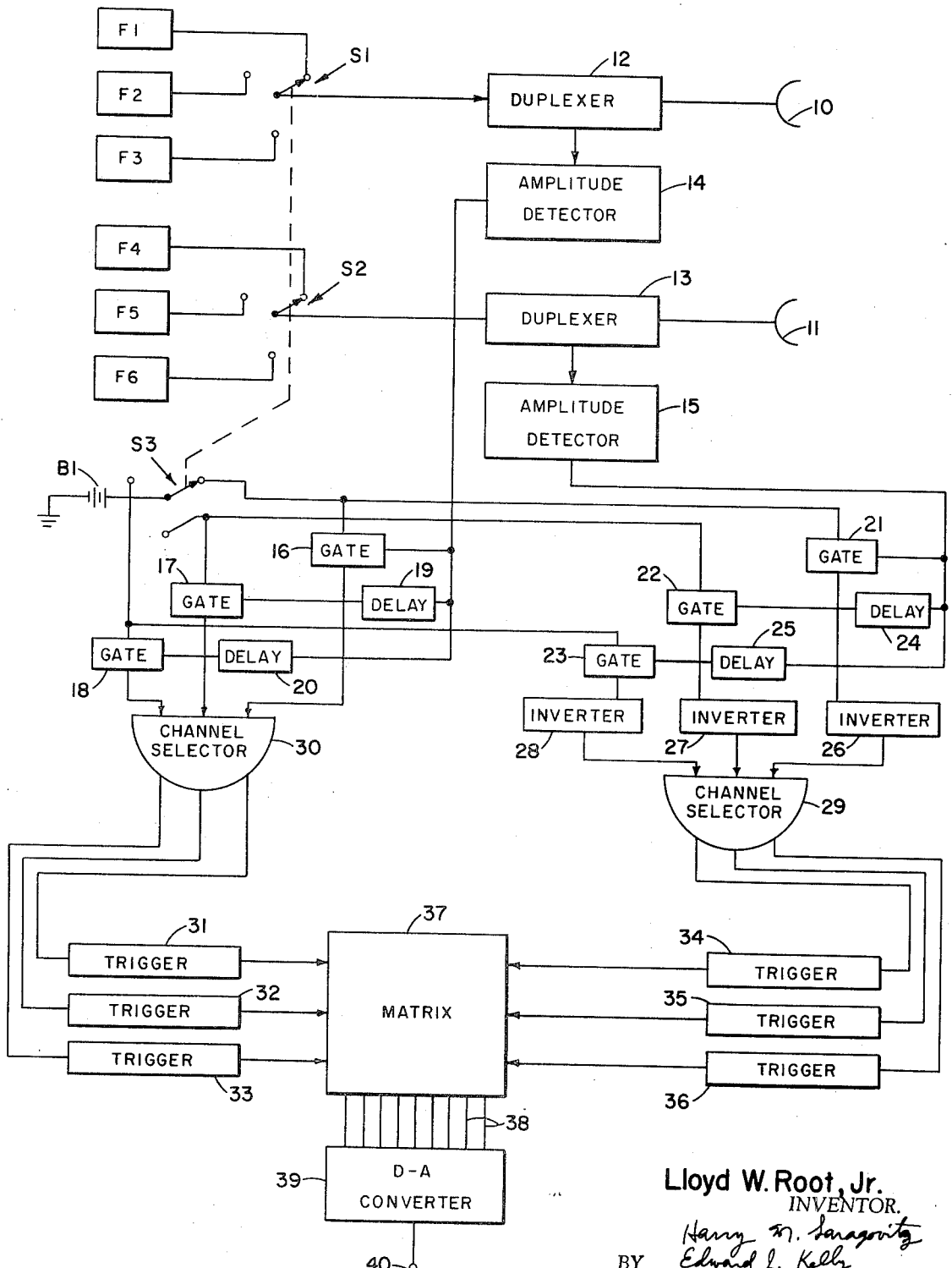
FIG. 1 of the drawings is a schematic diagram of a circuit for one embodiment of the invention.

An embodiment of the invention using two variable frequency waves is shown in FIG. 1. First and second radar antenna 10 and 11 are provided, and are connected to respective duplexers 12 and 13. R-$f$ power is provided to the duplexers by r-$f$ generators F1–F3 and F4–F6. F1–F3 can be selectively connected to duplexer 12 by rotary switch S1, and F4–F6, in similar manner, can be connected to 13 by switch S2. Amplitude detectors 14 and 15 are connected to respective duplexers. The echoes of signals from F1–F3 are received by antenna 10, and are fed to detector 14 by duplexer 12. The output of 14 is connected in parallel to three gates (16, 17, and 18). It is to be understood that detectors 14 and 15 may include frequency band-pass filters, and the normal amplifiers and/or mixers of a conventional radar receiver. The inputs to gates 17 and 18 are through delay lines 19 and 20. Gates 16–18 have control inputs from the fixed contacts of switch S3, and open to pass signals from detector 14 when voltage is applied from battery B1, through switch S3. Ganged switches S1–S3 are driven by a motor (not shown). As the movable contacts of switches S1 and S2 successively make with their fixed contacts, the different frequency pulses are connected through the respective duplexers to respective antennas. Echoes received by the antennas are detected by respective amplitude detectors (14 and 15). Detector 15 is connected through delay lines 24 and 25 to gates 22 and 23 and directly to gate 21, which gates have control inputs from switch S3. Connected to the outputs of each of gates 21, 22, and 23 are respective inverters 26, 27, and 28. The outputs of inverters 26, 27, and 28 are connected to respective inputs of channel selector 29. The outputs of gates 16, 17, and 18 are likewise connected to respective inputs of channel selector 30. Channel selectors 29 and 30 determine which input has the greatest amplitude, and pass only that input. Delay lines 19, 20, 24, and 25 provide delays sufficient to allow echoes from the various generators F1–F6 to appear simultaneously at the inputs to channel selectors 29 and 30. The channel selectors may take the form as shown in U.S. Pat. No. 2,974,286, to Mr. M. A. Meyer. The outputs of channel selector 29 are connected to triggers 31, 32, and 33, and the outputs of selector 29 are connected to triggers 34, 35, and 36. These triggers respond only if the amplitudes of the outputs of the channel selectors exceed a certain predetermined amplitude, which outputs are connected as inputs to matrix 37. Triggers 31–36 may be Schmitt circuits or the equivalent, and matrix 37 may be any of the well-known matrices, such as a diode matrix. The matrix has an output on one of the lines in cable 38 in response to each particular combination of inputs. Cable 38 is connected to digital-to-analog converter 39, which converter provides an analog output at point 40. Converter 39 may be of the ladder type of equivalent. If an analog output is not desired, obviously converter 39 may be omitted.

The operation of the FIG. 1 circuit is relatively simple. Detected echoes applied to gates 16–18 are simultaneously applied to selector 30. The detected echo having the greatest amplitude is passed by 30 and applied to one of triggers 31–33. If the amplitude of the echo is sufficient, the trigger operates and applies an input to matrix 37. The detected echoes from gates 21–23 are inverted, so that channel selector 29 passes what was the smallest amplitude echo at the gates. In similar manner to the other triggers, one of triggers 34–36 operates to apply an input to matrix 37. The particular combination of inputs to matrix 37 causes an output on a particular one of the lines of cable 38. It can thus be seen that the analog output at 40 depends on the difference between the frequencies of generators F1–F6 for the maximum amplitude echo from the waves of generators F1–F3, and the minimum amplitude echo from the waves of generators F4–F6. A complex target will have a very small difference in frequency, and a less complex (and probably less threatening) target will have a larger difference. Only six generators have been shown and described to keep the drawing simple, but obviously as many generators, or their equivalent as desired, could be used. The rather simple arrangement of switches S1, S2, and S3 could obviously be replaced by a more sophisticated arrangement. FIG. 1 is considered to be exemplary of an apparatus for one embodiment of the invention.

Figure 2:
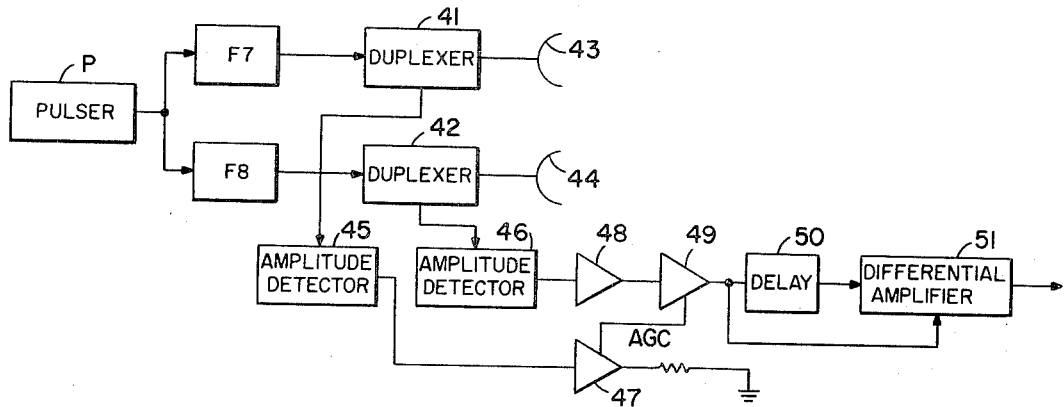
FIG. 2 is a schematic diagram of a circuit for another embodiment of the invention.

Another embodiment of the invention, as shown in FIG. 2, employs two fixed frequencies simultaneously directed to a target by pulser P, but with comparisons made of echoes at different time intervals. To this end, two generators (F7 and F8) are connected to respective duplexers 41 and 42, which duplexers are connected to respective antennas 43 and 44. Also connected to the duplexers are amplitude detectors 45 and 46. The outputs of the detectors are connected to amplifiers 47 and 48. Amplifier 47 provides an AGC signal to amplifier 49, so that the output of 49 is the ratio of echoes detected by the amplitude detectors. The output of 49 is applied to a delay line 50 and to one input of differential amplifier 51. The output of 50 is applied to the other input of 51. The delay introduced by delay line 50 is equal to the pulse interval of generators F7 and F8, as determined by pulser P. It can thus be seen that the output of amplifier 51 is equal to the difference in amplitude between the ratio of amplitudes of successive pulses from generators F7 and F8. A large difference would generally indicate a complex target, since such a target will have large differences in effective radar area for small changes in aspect angle. The output of 49 could be fed to a simple light bulb designed to flash every time the ratioed signal came from less than unity to greater than unity. Then each "+ unity" crossing would be radiated by a flash of light. Targets which caused the light to flash the fastest would be the most complex.

Figure 3:
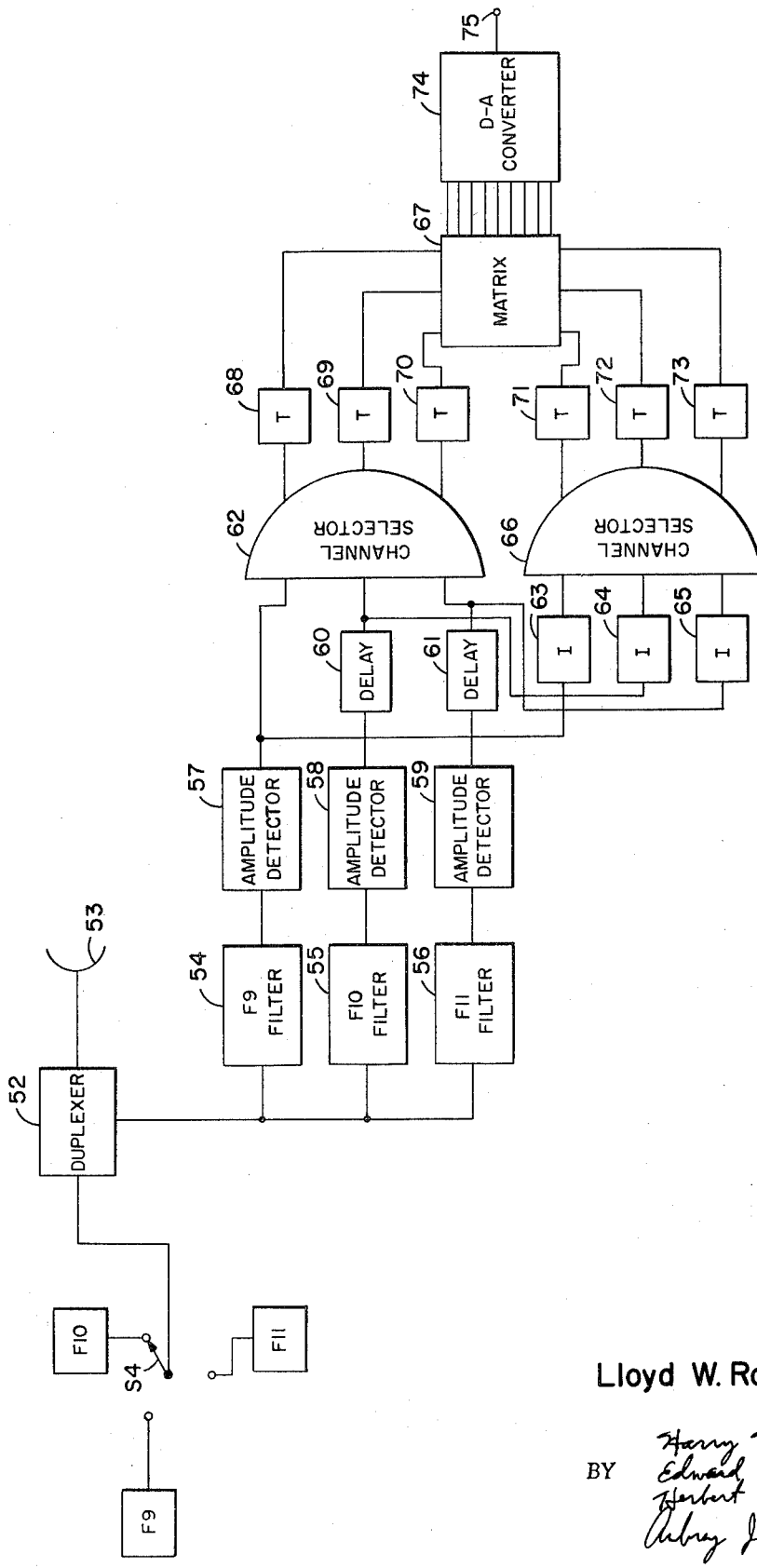
FIG. 3 is a schematic diagram of a circuit for a third embodiment of the invention.

Another embodiment of the invention, as shown in FIG. 3, detects the difference in frequency between a signal providing the greatest echo amplitude, and another signal providing the smallest echo amplitude. The smaller the frequency difference, the more complex the target. FIG. 3 has three r–f generators, F9, F10, and F11, connected to fixed contacts of rotary switch S4. Of course, more frequencies could be used if available. The movable contact of S4 is connected to duplexer 52. Also connected to the duplexer are antenna 53 and filters 54, 55, and 56. These filters respectively pass echoes of waves from generators F9, F10, and F11. Connected to respective filters 54, 55, and 56 are amplitude detectors 57, 58, and 59. The outputs of detectors 58 and 59 are connected through respective delay lines 60 and 61 to inputs of channel selector 62. The output of 57 is also connected to an input of 62. The outputs of detectors 57, 58, and 59 are connected to respective inverters 63, 64, and 65, with the output of each inverter being connected to an input of channel selector 66. Channel selector 62 has its outputs connected to matrix 67 through triggers 68, 69, and 70; and selector 66, through triggers 71, 72, and 73. The output lines of matrix 67 are connected to digital-to-analog converter 74 and appear as analog outputs as terminal 75. Operation of the FIG. 3 circuit is as follows: switch S4 rotates at some angular velocity determined by a motor or the like (not shown). Generators F9, E10, and E11 are successively connected to duplexer 52, and cause waves to be transmitted by antenna 53. Echoes of target(s) received by antenna 53 are passed to filters 54, 55, and 56, which filters pass only their respective frequencies. The outputs of the filters are detected, and eventually reach the channel selectors (62 and 66). Selector 62 passes only the maximum amplitude signal from the detectors, and selector 66 passes only the minimum amplitude signal from the detectors. Delay lines 60 and 61 insure that all of the signals from the detectors reach the channel selectors at the same time. In accordance with the particular outputs of selectors 62 and 66, matrix 67 has an output on one of its lines. This output is converted to an analog output at terminal 75 by converter 74. This analog output is representative of the difference in frequency between the greatest amplitude and least amplitude target echoes. While only three generators have been shown, obviously more frequencies could be provided by more generators, if desired. Echo return of targets two different peak levels could have been used rather than a peak and a minimum valve, if desired.

Figure 4:
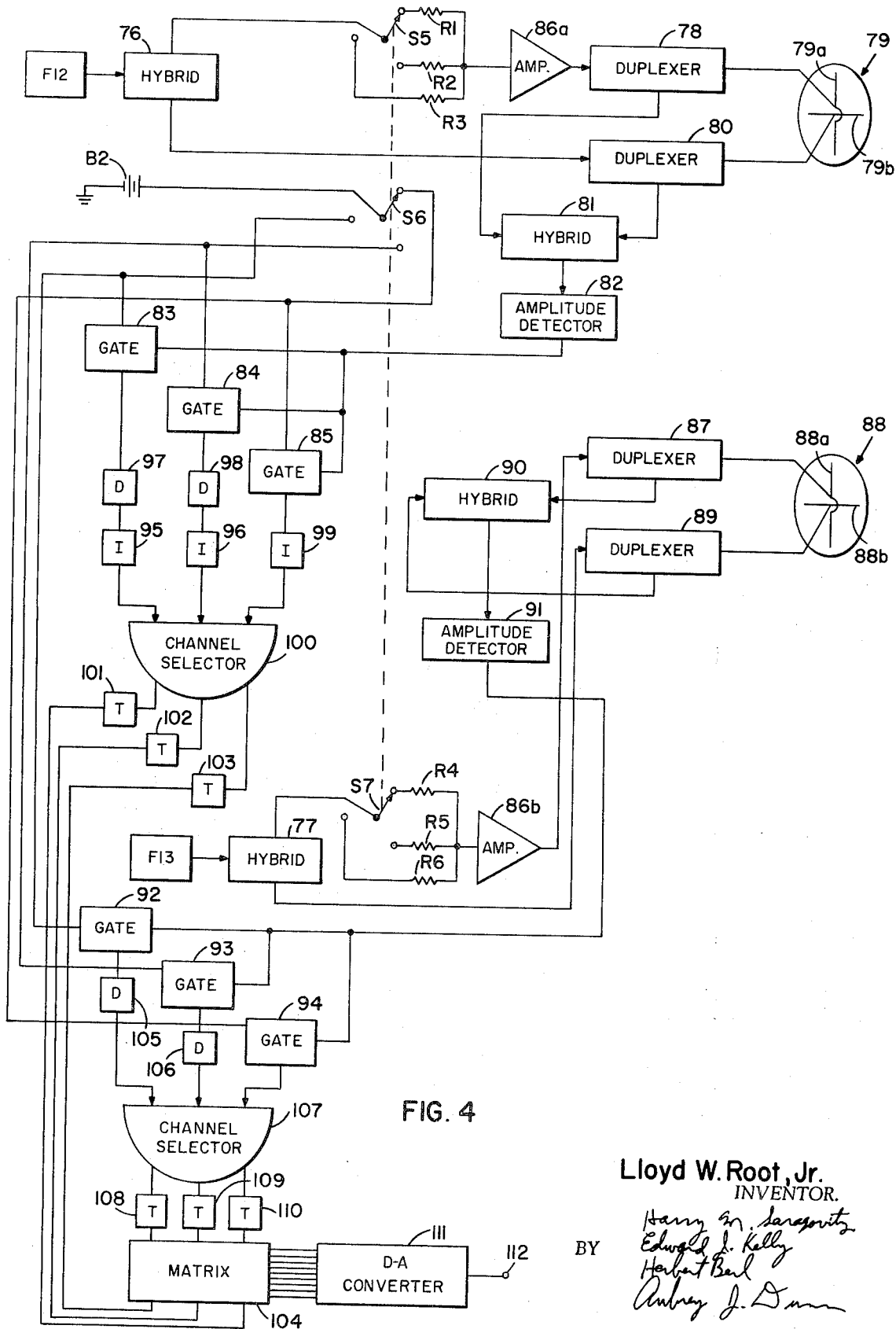
FIG. 4 is a schematic diagram of a circuit for a fourth embodiment of the invention and, FIG. 5 is a schematic diagram of a circuit for a fifth embodiment of the invention.

An embodiment of the invention using two different frequencies, with variable polarization, is shown by FIG. 4. This embodiment includes two r–f generators F12 and F13, connected to respective hybrids 76 and 77. The outputs of the generators are equally divided by the respective hybrids. One of the outputs of hybrid 76 is connected to the movable contact of rotary switch S5. The fixed contacts of S5 are connected through resistors R1, R2, and R3 to the input of amplifier 86a. This amplifier is needed only if the outputs of 76 are not in phase. Otherwise an attenuator is sufficient. These resistors are of different values and allow different input amplitudes to the amplifier. The output of the amplifier is connected through duplexer 78 to horizontally disposed dipole 79a of antenna 79. The other output of hybrid 76 is connected through duplexer 80 to vertically disposed dipole 79b of antenna 79. Target echoes from dipoles 79a and 79b are combined in hybrid 81, and are detected by detector 82. The output of 82 is connected to gates 83, 84, and 85. A control input of each of these gates is connected to a respective fixed contact of switch S6, with the movable contact of the switch connected to voltage source B2. Switches S5, S6, and S7 are ganged together and are rotated by a motor (not shown). Elements F13, 77, S7, R4, R5, R6, 86b, 87, 88, 88a, 88b, 89, 90, 91, 92, 93, and 94 correspond respectively to elements F12, 76, S5, R1, R2, R3, 86a, 78, 79, 79a, 79b, 80, 81, 82, 83, 84, and 85 and operate in the same manner. The outputs of gates 83 and 84 are connected to inverters 95 and 96 through delay lines 97 and 98, and the output of gate 85 is directly connected to inverter 99. The outputs of inverters 95, 96, and 99 are connected to inputs of channel selector 100. The outputs of 100 are connected through triggers 101, 102, and 103 to inputs of matrix 104. The outputs of gates 92 and 93 are connected through delay lines 105 and 106 to channel selector 107, and the output of gate 94 is directly connected to 107. The outputs of 107 are connected through triggers 108, 109, and 110 to matrix 104. The output lines of 104 are connected into D–A converter 111, and an analog output is provided at terminal 112.

From the arrangement of antennas 79 and 88, the equivalent of linearly polarized waves of variable polarization is achieved. The vertically disposed dipoles (79a and 88a) have their output waves varied in amplitude. The combination of vertically and horizontally polarized waves realized in hybrids 81 and 89 is, in effect, that from a variable polarization, linearly polarized wave. The output from channel selector 100 is the minimum amplitude echo as the polarization as antenna 79 is varied, and the output from channel selector 107 is the maximum amplitude echo as the polarization of antenna 88 is varied. The analog output at 112 is directly related to the difference in polarization between the maximum and minimum amplitude echoes. The smaller the analog output, the more complex the target. Another method which would use analog rather than digital techniques would be simply rotating the dipole antennas and recording the angular position which received the maximum and minimum signal.

Figure 5:
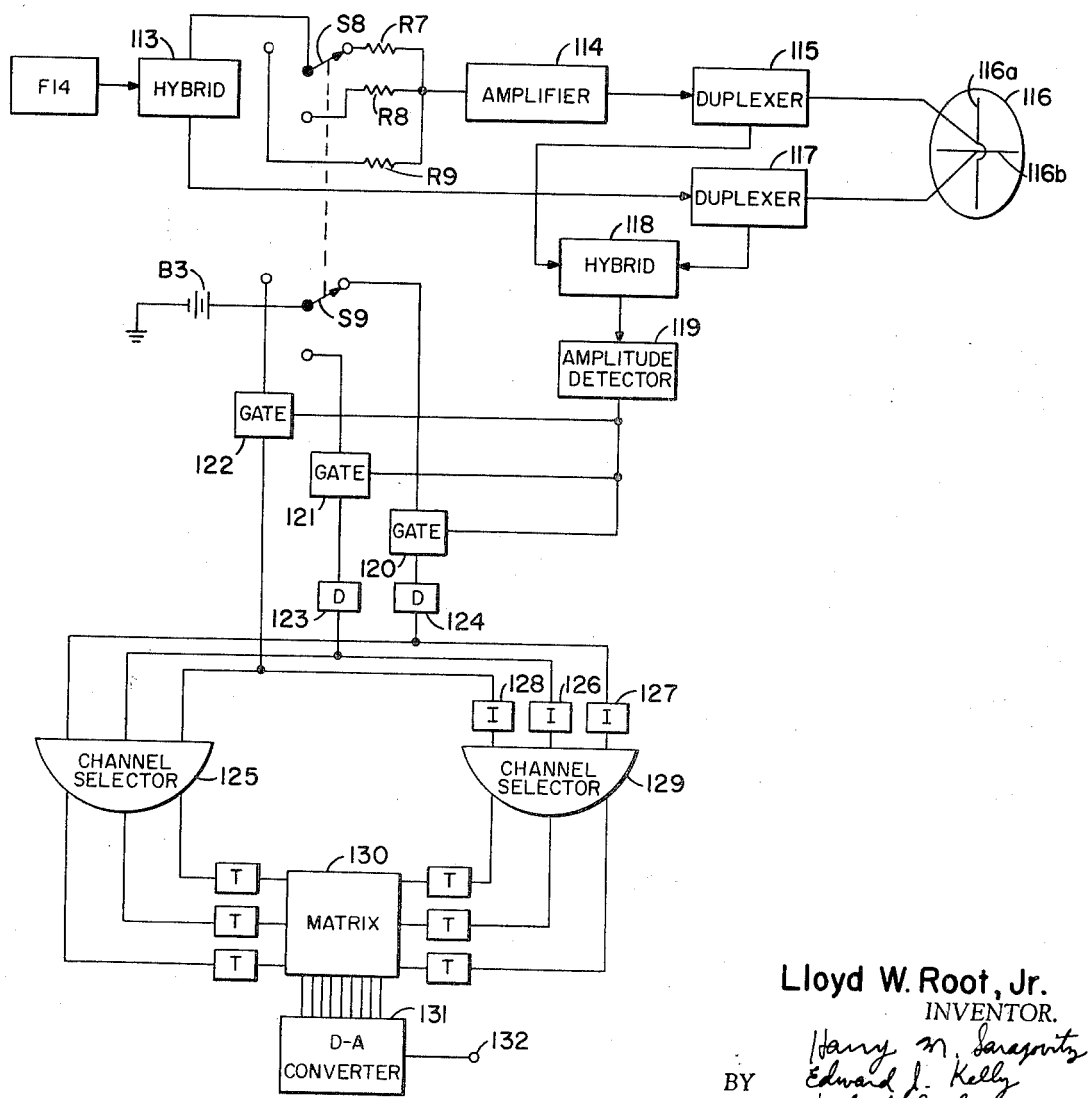

FIG. 5 is an embodiment of the invention wherein a single frequency wave is employed, with variable polarization of the wave. The wave is generated by r–f generator F14, and is divided by hybrid 113. One of the outputs of the hybrid is connected to the movable contact of rotary switch S8. Resistors R7, R8, and R9 are connected between the fixed contacts of the switch and the input to amplifier 114. The output of amplifier 114 is connected through duplexer 115 to vertical dipole 116a of antenna 116. The other output of hybrid 113 is connected through duplexer 117 to horizontal dipole 116b of antenna 116. Echoes received by antenna 116 are passed to hybrid 118 by duplexers 115 and 117. The output of 118 is detected by amplitude detector 119, with the output of 119 connected to gates 120, 121, and 122. Control inputs to each of the gates is from voltage source B3 through rotary switch S9. Switches S8 and S9 are ganged together and rotated by a motor (not shown). The outputs of gates 120 and 121 pass through delay lines 123 and 124 to channel selector 125, and the output of gate 122 is directly connected to 125. The outputs of delay lines 123 and 124, and the output of gate 122 are also connected to respective inverters 126, 127, and 128. The outputs of the inverters are connected to respective inputs of channel selector 129. Each of the outputs of selectors 125 and 129 is connected through a trigger to an input of matrix 130. The output lines of 130 are connected to a D–A converter 131, with an output terminal 132. Channel selector 125 passes the maximum amplitude echo, and selector 129 passes the minimum amplitude echo, so that the output of converter 131 is indicative of the difference in polarization for maximum and minimum echoes. Obviously, analog techniques could be used as described above, if desired.

While specific embodiments of the invention have been disclosed, other embodiments may be obvious to one skilled in the art from the instant disclosure, and the scope of the invention should be limited only by the claims.

I claim:

1. A radar target discriminating method including the steps of:

simultaneously illuminating said target with first and second different frequency waves,
varying the frequencies of said waves,
receiving echoes of said waves,
detecting the amplitude of said echoes,
producing signals in accordance with the change of the amplitude of said detected echoes as said frequencies are varied by:
    determining the frequency at which the maximum amplitude detected echo appears, as said first wave is varied in frequency,
    determining the frequency at which the minimum amplitude detected echo appears as said second wave is varied in frequency, and
generating an output indicative of said determined frequencies.

2. A radar target discriminating method including the steps of:

illuminating said target with an electromagnetic wave having certain characteristics,
receiving echoes of said waves,
varying one of said characteristics, and
producing signals in accordance with the change in amplitude of said detected echoes as said characteristics is varied wherein said one characteristic is amplitude, and first and second different frequency waves are employed, said signals are produced by:
    determining the ratio between the amplitudes of echoes of each of said waves at time intervals, and
    generating a signal equal to the difference between said ratios for different time intervals.

3. A radar target discriminating method including the steps of:

illuminating said target with electromagnetic waves having discrete characteristics,
receiving echoes of said waves,
varying one of said characteristics, and
detecting the amplitude of said echoes,
time varying at least one of said disctete characteristics, and
producing signals in accordance with the change of the amplitude of said detected echoes as said characteristic is varied by:
    determining the frequency at which the maximum amplitude detected echo appears as said wave is frequency varied,
    determining the frequency at which the minimum detected echo amplitude appears as said wave is frequency varied, and
    generating an output indicative of said determined frequencies.

4. A radar target discriminating method including the steps of:

illuminating said target with electromagnetic waves having discrete characteristics,
receiving echoes of said waves,
detecting the amplitude of said echoes,
time varying at least one of said discrete characteristics, and
producing signals in accordance with the change of the amplitude of said detected echoes as said characteristic is varied,
wherein first and second different frequency waves are employed, said one characteristic of each wave is polarization, and said signals are produced by:

determining the polarization at which the maximum amplitude detected echo appears as said first wave is polarization varied, determining the polarization at which the minimum amplitude detected echo appears as said second wave is polarization varied, and generating an output indicative of said determined polarizations.

5. A radar target discriminating method including the steps of:

illuminating said target with an electromagnetic wave having certain characteristics, receiving echoes of said waves, varying one of said characteristics, and producing signals in accordance with the change in amplitude of said detected echoes as said characteristic is varied, wherein said one characteristic is polarization, and said signals are produced by:

determining the polarization at which the maximum amplitude detected echo appears as said polarization is varied, determining the polarization at which the minimum amplitude detected echo appears as said polarization is varied, and generating an output indicative of said determined polarizations.

6. A radar target discriminating apparatus comprising:

means for transmitting an electromagnetic wave having certain characteristics, means for receiving echoes of said wave, means for detecting the amplitude of said echoes, means for varying one of said characteristics, and means for producing signals for changes in the detected amplitudes of said echoes as said characteristic is varied wherein said means for varying includes:

plural $r$–$f$ generator means, and means for alternately connecting said generator means to said means for transmitting;

said means for producing includes:

plural $r$–$f$ filter means connected between said means for receiving and said detector means;

said detector means includes:

an individual detector circuit for each of said filter means;

said means for producing includes:

a first channel selector having inputs and outputs, delay means connected between each of said detector circuits, less one, and an input of said selector, matrix means having outputs and two groups of inputs, a second channel selector having inputs and outputs, inverter means connected between each of said delay means and an input of said second channel selector, and said one detector circuit and another input of said second selector, first trigger means connected between said first channel selector outputs and said first group of inputs of said matrix, and second trigger means connected between said second channel selector outputs and said second group of inputs of said matrix.

7. A radar target discriminating apparatus comprising:

means for transmitting an electromagnetic wave having certain characteristics, means for receiving echoes of said wave, means for detecting the amplitude of said echoes, means for varying one of said characteristics, and means for producing signals for changes in the detected amplitudes of said echoes as said characteristic is varied, wherein said means for varying includes:

$r$–$f$ generating means, power dividing means having an input connected to said generating means, and outputs;

variable amplifier means;

said transmitting means including first and second orthogonal dipoles, one of said outputs of said power dividing means connected to said first dipole, another of said outputs of said power dividing means connected to the input of said variable amplifier means, the output of said amplifier connected to said second dipole, said means for receiving including:

power combining means connected between said dipoles and said means for detecting;

said means for producing including:

a first channel selector having inputs and outputs, delay means connected to each of said inputs of said channel selector, less one, gate means connected between said means for detecting and each of said delay means, means connecting each of said delay means to a respective input of said first channel selector, an additional gate means connected between said means for detecting and another input of said first channel selector, a second channel selector having inputs and outputs, inverter means connected between each of said delay means, said additional gate means, and said inputs of said second channel selector, matrix means having outputs and a first and a second group of inputs, first trigger means connected between said outputs of said first channel selector and said first group of inputs of said matrix means, and second trigger means connected between said outputs of said second channel selector and said second group of inputs of said matrix means.

8. A radar target discriminating apparatus comprising:

means for transmitting electromagnetic waves having certain characteristics, means for receiving echoes of said waves, means for detecting the amplitude of said echoes, means for varying at least one of said characteristics of said waves, and means for producing signals for the changes of amplitude of the detected echoes as said characteristic is varied, wherein said means for varying includes:

a first and a second plurality of wave generators, a first and a second means for alternately selecting one of each of said plurality of generators, said means for producing including a first and a second pluarlity of gates, each gate having a control input, a signal input, and an output, means for alternately applying a control potential to the control inputs of said gates, first and second delay means conncted respectively to each of said signal inputs of said first and second plurality of gates, except one, said first means for detecting having an output connected to each of said first delay means to said one excepted signal input of said first plurality of gates, said second means for detecting having an output connected to each of said second delay means and to said excepted signal input of said first plurality of gates, first and second channel selectors each having inputs and outputs, the outputs of said first and second plurality of gates connected respectively to the inputs of said first and second channel selectors, signal converting means having a first and a second plurality of inputs and an output, said outputs of said first and second channel selectors connected to respective ones of said first and second plurality of inputs of said signal converting means.

9. A radar target discriminating apparatus comprising:

means for transmitting an electromagnetic wave having certain characteristics, means for receiving echoes of said wave, means for detecting the amplitude of said echoes, means for varying one of said characteristics, and means for producing signals for changes in the detected amplitudes of said echoes as said characteristic is varied, wherein said means for varying includes:

a plurality of different frequency wave generators, means for alternately connecting each of said generators to said means for transmitting;

said means for detecting including:

a plurality of filters tuned to and equal in number to the number of said generators, and plural detectors;

said means for producing including:

a first channel selector having inputs and outputs, plural delay lines connected between respective detectors, but one, and the inputs of said first channel selector, a second channel selector having inputs and outputs, plural inverter means connected one between each of said delay means and said inputs, but one, of said second channel selector, an additional inverter means connected between said one detector and said one input of said second channel selector, signal converting means having a first and a second plurality of inputs and an output, said outputs of said first and second channel selectors connected to respective ones of said first and second plurality of inputs of said signal converting means.

10. A radar target discriminating apparatus comprising:

means for transmitting electromagnetic waves having certain characteristics, means for receiving echoes of said waves, means for detecting the amplitude of said echoes, means for varying at least one of said characteristics of said waves, and means for producing signals for the changes of amplitude of the detected echoes as said characteristic is varied, wherein said means for varying includes:

first and second different frequency wave generators, first and second power dividing means each having outputs and each having an input, with said input connected respectively to said first and second generators, and first and second variable connecting means connected respectively to outputs of said first and second power dividing means;

said means for transmitting including:

first and second antennas each having a first dipole and a second dipole, said dipoles being orthogonal to each other, a first duplexer connected between said first connecting means and said first dipole of said first antenna, a second duplexer connected between another output of said first power dividing means and said second dipole of said first antenna, a third duplexer connected between said second connecting means and said first dipole of said second antenna, a fourth duplexer connected between another output of said second power dividing means and said second dipole of said second antenna;

said means for receiving including first and second power combining means each having inputs and an output;

said first and second duplexers connected to said inputs of said first power combining means;

said means for producing including:

a first and a second plurality of gates, each gate having a signal input, a control input, and an output;

said means for detecting including:

a first detector connected between said first power combining means and each signal input of said first plurality of gates, a second detector connected between said second power combining means and each signal input of said second plurality of gates;

said means for producing further including:

first and second channel selectors each having inputs and outputs, a first and second plurality of delay means, a plurality of inverters each having an input and an output, said first plurality of gates connecting respective ones of said outputs of said inverters, less one, to respective ones of the outputs of said first plurality of gates, less one, said one gate connected to the input of said one inverter, said outputs of said inverters connected to respective inputs of said first channel selector, said second plurality of delay means connected between respective outputs of said second plurality of gates, less one, and said inputs of said second channel selector, signal converting means having first and second inputs and an output, and said outputs of said first channel selector connected to said first inputs of said signal converting means, and said outputs of said second channel selector connected to said second inputs of said signal converting means.

11. A radar target discriminating apparatus comprising:
means for transmitting electromagnetic waves having certain characteristics,
means for receiving echoes of said waves,
means for detecting the amplitude of said echoes,
means for varying at least one of said characteristics of said waves, and
means for producing signals for the changes of amplitude of the detected echoes as said characteristic is varied, wherein said means for varying includes:
first and second r-f generators, and
a pulser connected to said generators;
said means for transmitting includes:
first and second antennas,
means for connecting said generators to said antennas;
said means for detecting includes:
first and second detector circuits, connected to said means for connecting; and
said means for producing includes:
first and second amplifiers, each having an input and a signal output, said second amplifier also having an AGC output,
a third amplifier having a signal input, a control input, and an output,
said inputs of said first and second amplifiers connected respectively to said first and second detector circuits, said signal output of said first amplifier connected to said signal input of said third amplifier, and said AGC output of said second amplifier connected to said control input of said third amplifier,
a differential amplifier having inputs and an output,
delay means connected between said output of said third amplifier and an input of said differential amplifier, and
means connecting said output of said third amplifier to another input of said differential amplifier.

* * * * *